United States Patent Office 3,229,612
Patented Jan. 18, 1966

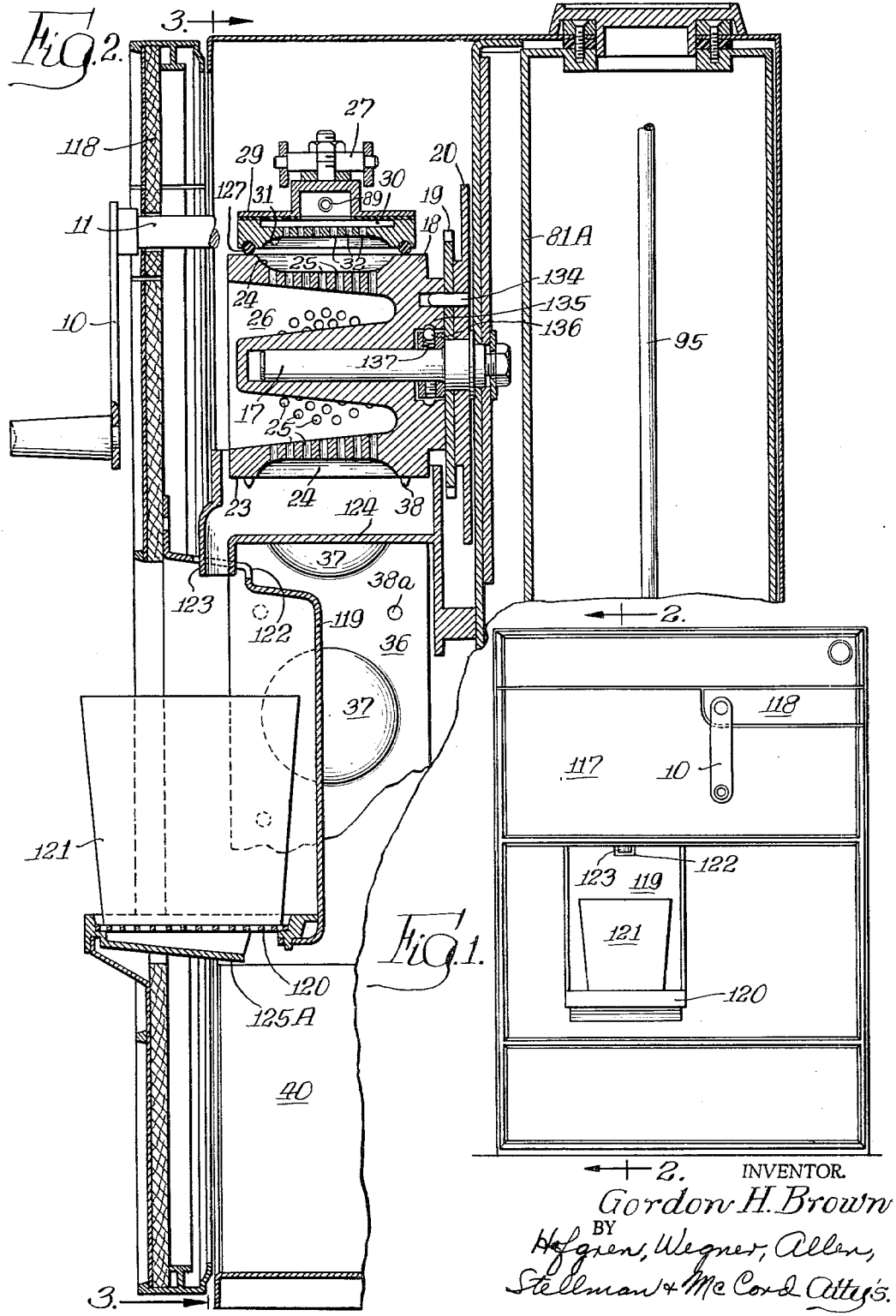

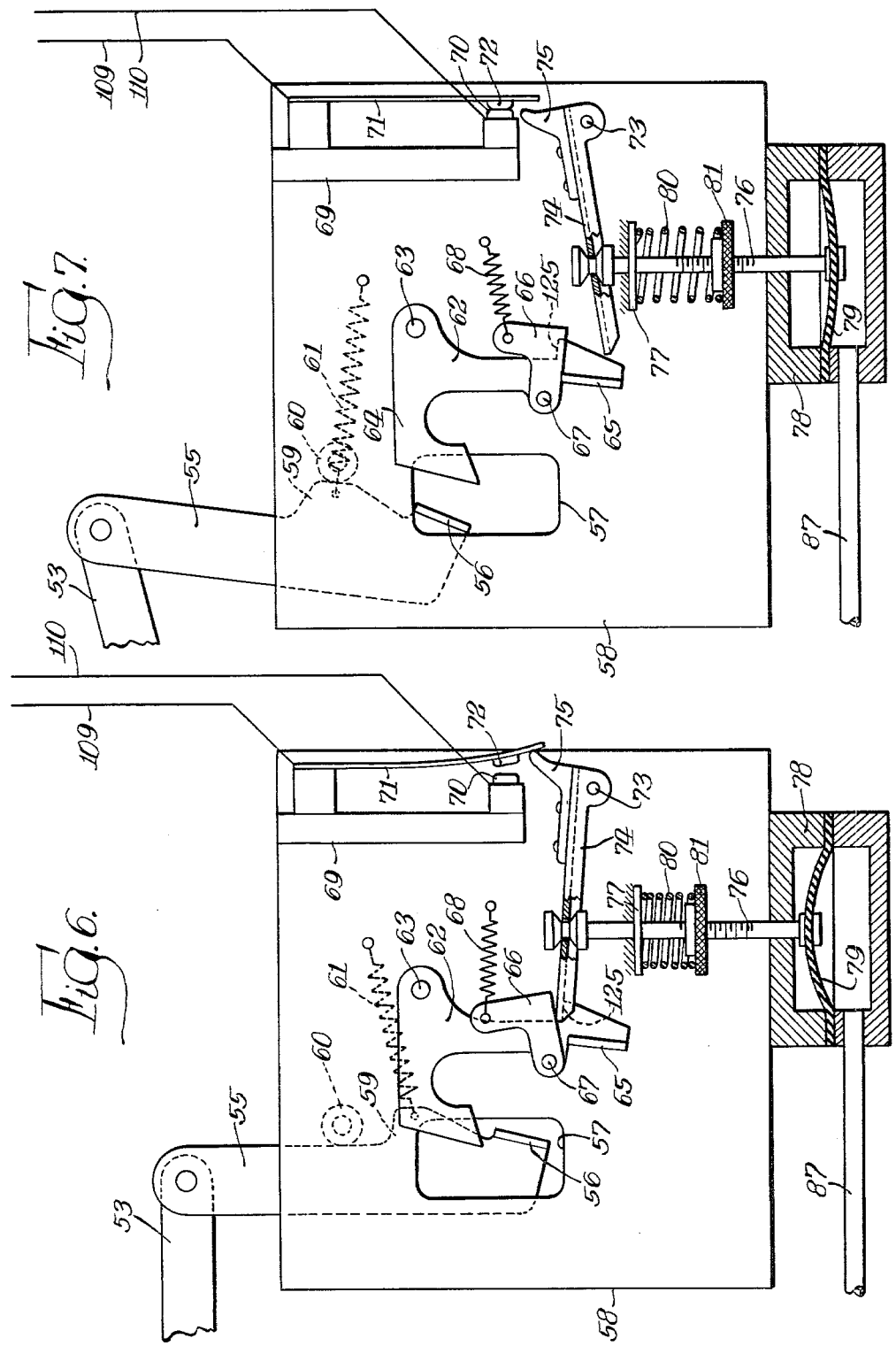

3,229,612
ROTARY HEAD COFFEE INFUSOR
Gordon H. Brown, St. Joseph, Mich., assignor to Whirlpool Corporation, a corporation of Delaware
Filed Jan. 29, 1963, Ser. No. 254,679
10 Claims. (Cl. 99—282)

This invention relates to a beverage maker and dispenser in which a single portion of beverage is produced by contacting a measured portion of hot water with a measured portion of a beverage producing dry material or mix.

In the apparatus of this invention a single portion of beverage, such as a single cup of coffee in the illustrated embodiment, is produced as desired by flowing the portion of hot water equivalent to the cup in size through a measured portion of a dry material or dry mix to produce the beverage. Where the beverage is coffee the dry mix is preferably the ground bean.

One of the features of this invention is to provide an improved apparatus whereby an automatically measured portion of hot water is contacted under carefully controlled conditions with a measured portion of a dry material or dry mix to produce a measured portion of beverage.

Other features and advantages of the invention will be apparent from the following description of one embodiment thereof taken in conjunction with the accompanying drawings. Of the drawings:

FIGURE 1 is a front elevational view of an apparatus embodying the invention.

FIGURE 2 is an enlarged broken sectional view taken substantially along line 2—2 of FIGURE 1.

FIGURE 6 is a detail elevation of a portion of the apparatus when the apparatus is not operating.

FIGURE 7 is a view similar to FIGURE 6 but showing this detail when the apparatus is operating.

Figure 3:
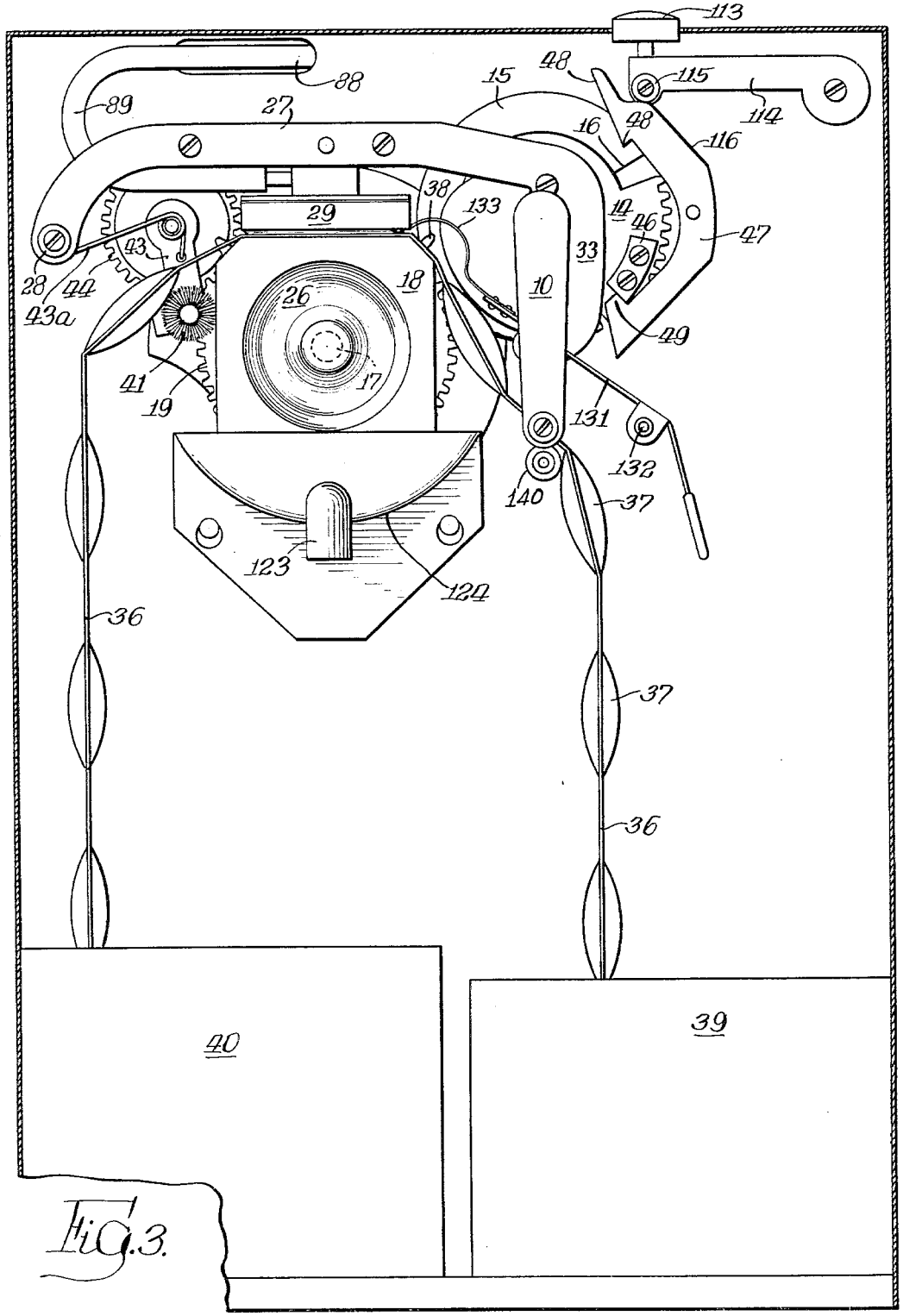
FIGURE 3 is a sectional elevational view taken substantially along line 3—3 of FIGURE 2 but with the operating handle being shown in front elevation for purposes of illustration.

The specific apparatus shown in the drawings for illustrative purposes is arranged for brewing a single cup of coffee, for example, at a time and includes certain automatic safety features to insure that uniform cups will be made at all times. In order to aid in understanding the construction of the apparatus the embodiment of FIGURE 5 which is a simplified schematic exploded view of certain of the parts will be described first.

Figure 5:
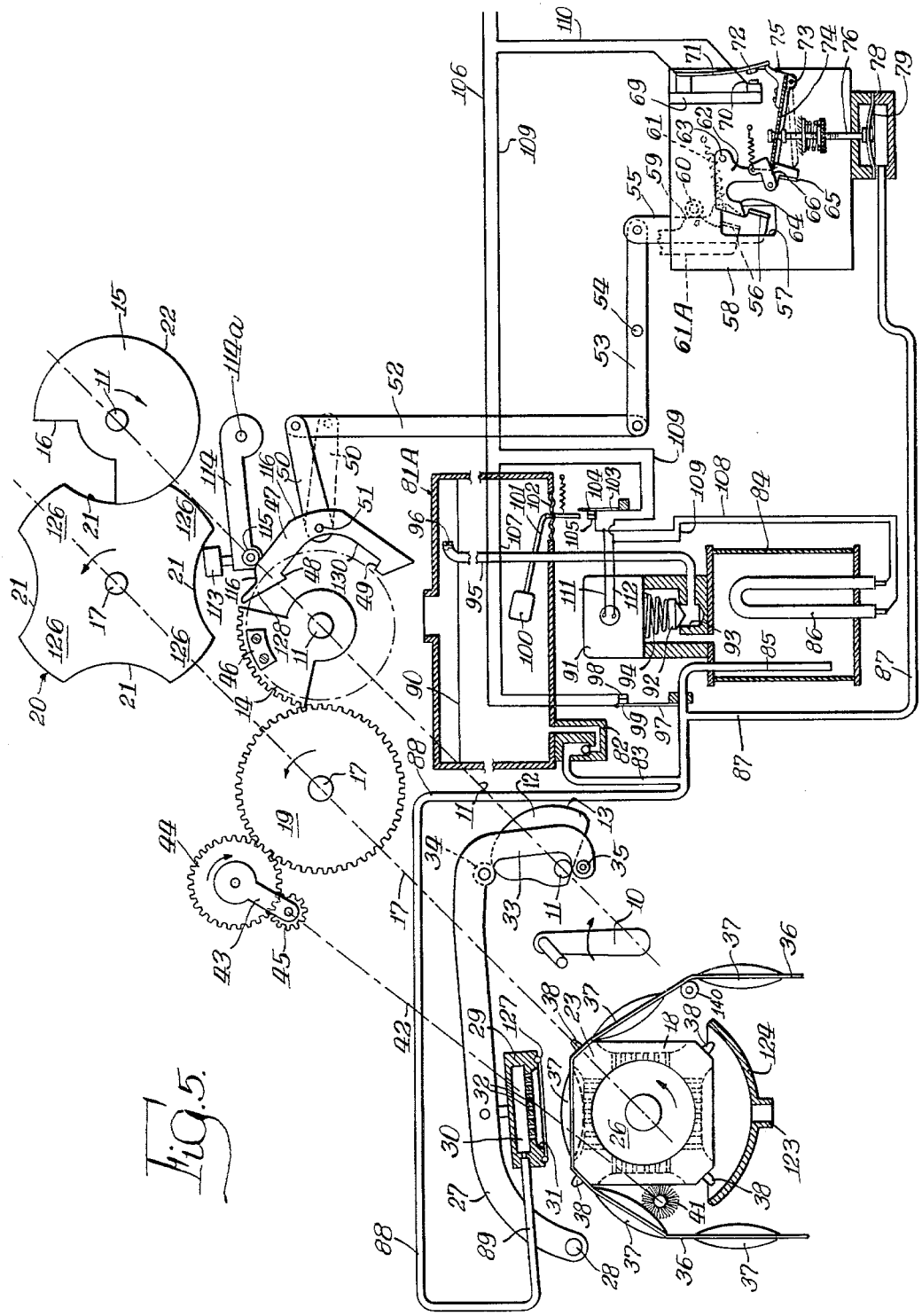
FIGURE 5 is a schematic and wiring diagram of the apparatus with certain parts shown as simplified alternate embodiments.

As shown in FIGURE 5, there is provided an operating handle 10 that is normally in a downwardly extending position, as shown in FIGURES 1, 2 and 3, at the beginning of the brewing operation but that is shown in FIGURE 5 as having been turned 180°. For brewing a single cup of coffee, the handle is turned from its downward position 360° so that the position of the handle 10 in FIGURE 5 illustrates the position of the handle and other parts of the apparatus half-way through the cycle sequence.

The handle 10 is fixedly mounted on a shaft 11 illustrated schematically by the broken line in FIGURE 5. Also fixedly mounted on this shaft 11 is a cam 12 having an outer periphery 13, a segment gear 14 having a periphery covering approximately 90° and designated a second gear and a locking disk 15 being generally circular in shape but cut away at the periphery as indicated at 16 for approximately 90°.

Arranged substantially parallel to the shaft 11 is another shaft 17 on the front end of which is removably mounted a brewing body 18. Rearwardly of the brewing body 18 is a circular gear 19 whose periphery is arranged to be engaged by the segment gear 14. The gear 19 is identified as a first gear. Also mounted on the shaft 17 rearwardly of the gear 19 is a locking plate 20 having four equally spaced arcuate edge portions 21 each adapted to make sliding engagement with the periphery 22 of the locking disk 15. The locking plate 20 is here identified as a first locking member while the disk 15 is a second locking member.

The construction details of the brewing body 18 are illustrated in FIGURE 2. As is shown here, the brewing body 18 is provided with four peripheral flat surfaces 23 equally spaced around the body 18. The brewing body 18 is identified as an infuser body and on each of the flat peripheral surfaces 23 there is formed a hollowed out receptacle section 24. The body 18 at the bottom of each section 24 is provided with a plurality of spaced openings 25 leading to the hollow interior 26 of the body 18. The infuser body or brewing body 18 is mounted for rotation about a horizontal axis which coincides with the axis of the shaft 17. The infuser body 18 is prevented from rotating relative to gear 19 and locking plate 20 by pin 134 which is fixedly attached to gear 19 and locking plate 20. The infuser body 18 is held on shaft 17 by annular groove 135 cooperating with ball 136. Ball 136 is biased against groove 135 by spring 137. Ball 136 positions itself in one of four pits (not shown) in annular groove 135, located every 90° in groove 135 to hold the body in fixed position. As is shown in FIGURE 2, the gear 19 is mounted immediately behind the body 18 while the locking plate 20 is mounted directly behind the gear 19.

Located above the brewing body 18 is a lever 27 hingedly mounted at one end 28. Carried by the lever above the brewing body 18 is a brewing or infuser head 29 having an internal chamber 30 and a bottom cavity 31 connected to the chamber 30 by means of a plurality of openings 32.

The end 33 of the lever 27 opposite the hinged end 28 is bent downwardly in a generally right angle to the remainder of the lever and is provided at the top and bottom with a pair of rollers 34 and 35. As can be seen in FIGURE 5, these rollers bear against the periphery of the cam 12 which has generally the shape of a 90° segment of a circle with the center of rotation of the cam being the center of the circle.

Adapted to cooperate with the infuser body and infuser head 29 is a tape 36 of a liquid permeable material such as filter paper carrying spaced pockets or pods 37 of the beverage producing dry mix or dry material. These pods 37 constitute measured portions of the beverage producing dry material and are spaced from each other a distance equal to the spacing of the peripheral receptacle sections 24 on the infuser body 18. This spacing is important as when the body 18 is turned in the manner to be described hereinafter the tape 36 is drawn along with it so that succeeding pods 37 are positioned in succeeding receptacle sections or cavities 24 as they become the topmost or horizontal cavity. In order to accomplish this cooperative movement of the tape 36 with the moving body 18, interengaging means are provided such as the corner pins 38 on the body 18 engaging corresponding holes 38a, FIGURE 2, at the edges of the tape 36. In the embodiment illustrated the pods 37 on the left-hand side of FIGURE 5 are used pods while those on the right-hand side are fresh ones. The unused portion of the tape 36 is stored in a receptacle 39 (FIGURE 3) while the used section of the tape is stored in a receptacle 40.

In order to hold the tape 36 tightly against the infuser body 18, there is provided an arm 131 hingedly mounted at 132 and having spring fingers 133 bearing against the tape 36 on the dry tape side of the infuser head 29.

In order to prevent the wet tape and pods from adhering to the infuser body 18, there is provided a removing means, here exemplified by a rotary brush 41, that is rotatably mounted on a shaft 42 illustrated schematically in FIGURE 5. This shaft 42 is carried by the lower end of an arm 43 that is attached to a third circular gear 44 whose periphery engages that of the first gear 19. The shaft 42 is rotated by being attached to a small gear 45 whose periphery engages the third gear 44 and which is mounted on the arm 43. As the gear 44 is rotated by the rotation of gear 19, gear 45 and brush 41 are also rotated. This arrangement causes the brush 41 to rotate in the same direction as the movement of the used tape 36 thereby moving tape 36 outwardly away from the infuser body 18 on each 90° movement of the body 18 so that the tape 36 will be pulled away from body 18. Brush 41 and shaft 42 are moved along the outer periphery of body 18 by the approaching corner of body 18. Spring 43a yieldingly urges arm 43, and thus shaft 42 and brush 41, to the right as viewed in FIGURES 2 and 5 to provide the necessary bias to assure that brush 41 is in engagement with the outer periphery of body 18 during each 90° rotation of body 18. The brush 41 and roller 140 on the opposite side of body 18 operate as guide means engaging the tape 36 to permit only one pod 37 being received in only one receptacle section at any one time.

The segment on the second gear 14 is provided with a stop 46 attached thereto. Positioned beside the gear 14 on the side opposite the gear 19 is a stop latch 47 having an upper catch 48 and a lower catch 49. As can be seen from FIGURE 5, the stop latch 47 is of generally arcuate shape with the catches 48 and 49 being on the inner surface and each located adjacent an opposite end of the latch. The stop latch 47 is fixedly attached at about its midpoint to one end of a first arm 50. This arm 50 is arcuately movable about a fulcrum 51 which is the point of attachment of the latch 47 and arm 50. The other end of the arm 50 is pivotally attached to the upper end of a vertical second arm 52 with the lower end thereof being pivotally attached to one end of a third arm 53 which is generally horizontal and fulcrumed at about its midpoint 54. The other end of the arm 53 is pivotally attached to the upper end of a generally vertical fourth arm 55 whose lower end is provided with a catch 56 which extends through an opening 57 in a mounting plate 58. The arm 55 is provided with a front or right-hand surface as viewed in FIGURES 5, 6 and 7 shaped as a cam with an extended part 59 adapted to ride against a roller 60 located behind the mounting plate 58. The surface 59 is held against the roller 60 by means of a spring 61 also located behind the plate 58 having one end anchored to the plate and the other end anchored to the arm 55. The lowered position of the arm 55 is illustrated in solid lines in FIGURE 5 while the raised position is illustrated by the dotted line 61A.

Also mounted on the mounting plate 58 but at the front thereof is a lever 62 fulcrumed at 63 and in a generally inverted L shape with the fulcrum 63 being at the angle of the L. This lever 62 has one end 64 generally horizontal and adapted to be engaged by the catch 56 and the other end generally vertical and provided on its lower end with an outwardly turned flange serving as a stop 65. Normally engaging the stop 65 is an L-shaped lever 66 arranged as a bell crank with one end fulcrumed at 67 and normally bearing against the stop 65 and the other end connected to a helical spring 68 which urges the lever 66 in a generally clockwise direction as viewed in FIGURE 5 and at the same time urging lever 62 in a counterclockwise direction.

Mounted on the plate 58 is a support 69 for an electrical contact 70. Also mounted on the support 69 is a spring arm 71 carrying on its free end a contact 72 adapted to engage the contact 70 to complete an electric circuit therethrough.

Mounted on the plate 58 about a fulcrum point 73 at one end thereof is an arm 74 having at this end an upstanding finger 75. When the arm 74 is in its raised position as shown in FIGURES 5 and 6 the finger 75 engages the spring arm 71 to bend it to the right and separate the contact 72 from the contact 70.

Movable with the arm 74 is a generally vertical shaft 76 that is movable in a bracket 77 which is fixedly mounted to plate 58. The upper end of this shaft 76 is provided with a loose connection means to an intermediate area of the arm 74 for movement of arm 74 with the shaft 76, while the lower end of shaft 76 extends into a hollow housing 78 and is attached to a flexible diaphragm 79 that extends across the interior of the housing 78. In order to urge the shaft 76 and the attached arm 74 and diaphragm 79 downwardly, there is provided a helical spring 80 bearing downwardly on the adjustable collar 81 attached to the threaded shaft 76. The other end of the spring 80 bears against the bracket 77.

The water supply system in the embodiment of FIGURE 5 includes a water tank 81A connected at the bottom through a check valve 82 with a water line 83. The valve 82 is such that it permits flow of water from the tank into the line 83 but not in a reverse direction. The line 83 leads into a water boiler 84 by means of a dip tube 85 having its end spaced a short distance above the bottom of the boiler 84. Within the boiler 84 is an immersion heater 86 of large capacity such as 1500 watts.

Leading from the water line 83 on the exterior of the boiler 84 is a second water line 87 leading to the hollow interior of the housing 78 beneath the diaphragm 79.

From the first water line 83 is a third water line 88 having a flexible upper end 89 leading to the chamber 30 within the infuser head 29. The water line 88 including the flexible end 89 has its highest part above the maximum water level 90 within the water tank 81A.

Communicating with the top of the boiler 84 is a solenoid valve 91 having a plunger 92 that is pressed against a valve seat 93 by means of a conical spring 94 when the solenoid is de-energized. Energization of the solenoid draws the plunger 92 upwardly against the force of spring 94 to open the valve 91.

The valve 91 has the passage from the valve seat 93 communicating with a vent tube 95 that extends upwardly from the valve into the water tank 81A and has its upper end above the maximum water level 90 and provided with a flow restricting orifice 96.

Figure 4:
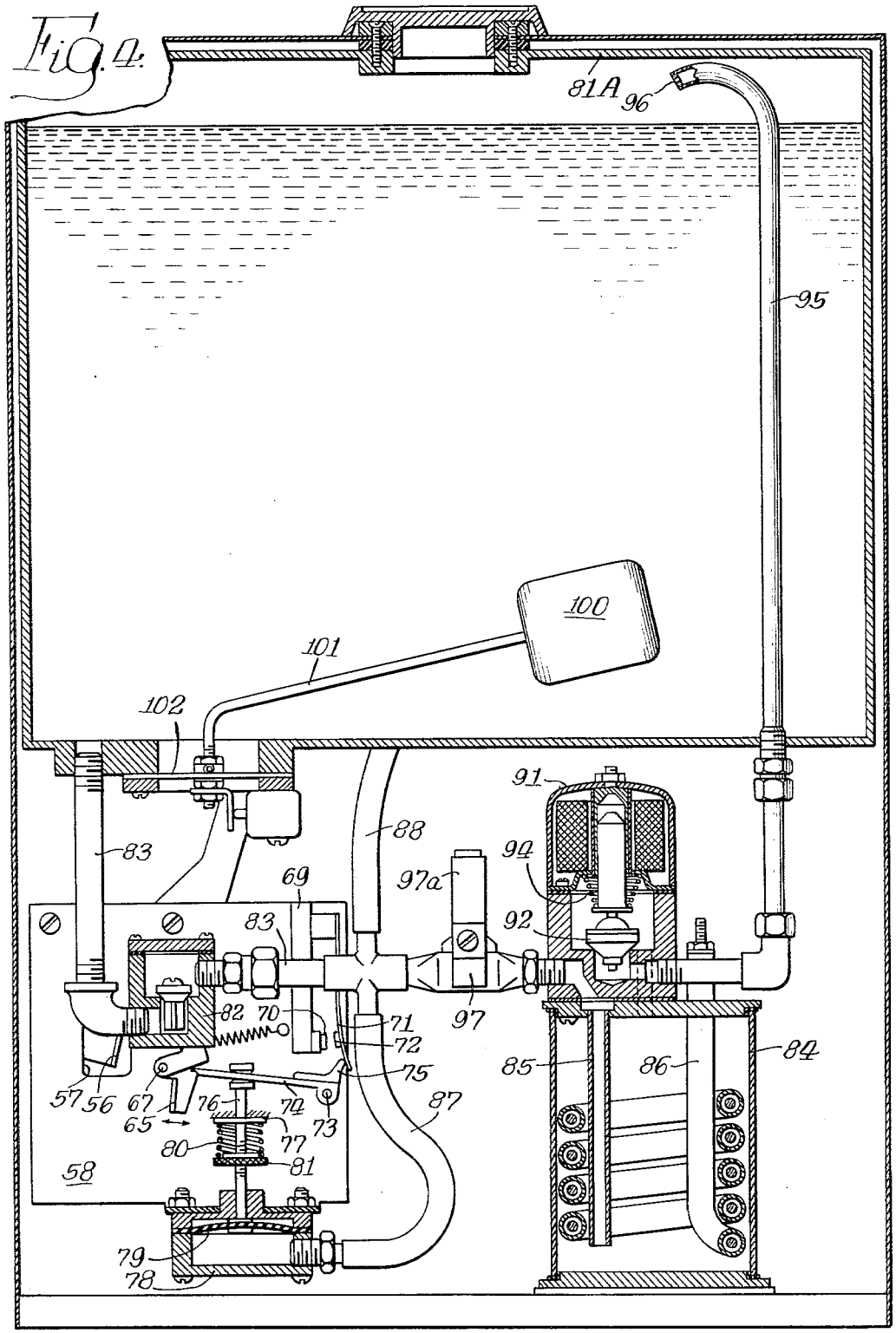
FIGURE 4 is a rear elevational view of the apparatus showing various parts in section for clarity of illustration.

The root of a bimetal thermostat switch 97 is positioned to receive heat or cold from the water line 83 at an area between the water line 87 and the dip tube 85. This thermostat switch 97 includes a movable bimetal arm 97a (FIG. 4) having a contact 99 at its upper end and a fixed contact 98.

In order to break the electrical circuit to the system when water within the tank 81A reaches a dangerously low level, the bottom of the tank is provided with a float 100 that is mounted on a fulcrumed arm 101. This arm extends through a flexible closure 102 forming a part of the bottom of the tank 81A. The bottom of the exterior portion of this arm 101 is adjacent a spring arm 103 that carries a movable contact 104. This contact 104 normally engages a second fixed contact 105. Whenever the water in the tank 81A gets dangerously low, the float 100 falls and the protruding end of the arm 101 moves to the right, as shown in FIGURE 5, to press the spring arm 103 to the right and move the movable contact 104 out of engagement with the contact 105.

The switches 70–72, 98–99 and 104–105 are arranged in electrical series. Also located in this electrical circuit are the resistance heater 86 and the solenoid valve 91 which are in parallel.

The electrical system includes a wire 106 leading from one side of a source of electric current to the contact 99. The cooperating contact 98 is connected by a wire 107 to the contact 104. Contact 105 is connected by way of a wire 108 to the heater 86, the other side of which is connected by wire 109 to the contact 72. The other contact 70 is connected by way of a wire 110 to the other side of the electric source. The circuit in the solenoid 91 is connected by wires 111 and 112 in parallel with the heater 86. In order to initiate operation of the device a button 113 is provided adapted to rotate a lever 114 which pivots about point 114a. This lever is provided with a roller 115 which rides on the outer surface 116 of the stop latch 47.

Different portions of the apparatus are shown in the other views of the drawings with certain of these portions or parts of the apparatus being shown with their normal appearance instead of schematically as is true in FIGURE 5. Therefore, similar numerals are used on similar parts in these other views.

As is shown in FIGURES 1 and 2, the front of the machine is provided with a door 117. The handle 10 extends through a fixed portion 118 of the front that is separate from the door. The door includes a recessed part 119 having a perforate shelf 120 on which is adapted to rest a cup 121. This recessed portion 119 is cut away at the top, as indicated at 122, so as to clear a tubular outlet 123 positioned above the cup 121 and leading from a funnel 124 that is positioned beneath the infuser body 18. The funnel 124 receives the beverage after it has flowed through the infuser body 18 and directs the beverage into the cup 121. Any overflow from the cup flows through the perforate shelf 120 and is directed by means of an inclined trough 125A into the waste receptacle 40 that contains the used portions of the filter tape 36.

As mentioned earlier, the schematic representation of FIGURE 5 shows the parts in an intermediate position after the release button 113 has been depressed and handle 10 has been turned one-half its distance or the first 180° in the 360° of its movement. The parts in FIGURES 1, 2, 3 and 4 are at the beginning of the operation. Thus, as shown in FIGURE 3, the handle 10 is extended downwardly, the lever 114 is in elevated position, the stop latch 47 is in its furthest clockwise position and the stop 46 engages the catch 49 so that the handle 10 cannot be rotated in a clockwise direction. Similarly, the opposite catch 48 is in position to intercept the stop 46 if an attempt is made to rotate the handle 10 in a counterclockwise direction as shown in FIGURE 3.

In order to initiate operation the lever 114 is depressed by pressing down on the button 113. This oscillates the stop latch 47 counterclockwise to the position shown in FIGURE 5 and at the same time raises the first arm 50 about its pivot 51, raises the second arm 52 and oscillates the third arm 53 in a clockwise direction to lower the fourth arm 55 so that the catch 56 thereon is beneath the end 64 of the lever 62. The raised position of the arm 55 is shown in dotted lines 61a at the lower left-hand part of FIGURE 5 which is the position when the stop latch 47 is in the position shown in FIGURE 3. The switch operating arm 74 is retained in raised position, as shown in FIGURE 5, by engagement of the free end of the arm 74 with a catch 125 that forms a part of the lever 62. The arm 74 has been elevated to this position through liquid pressure beneath the diaphragm 79 within the housing 78 caused by a previous coffee making operation.

When the stop 46 has been thusly released from the catch 49 by downward pressure on the button 113, the handle 10 is turned in a clockwise direction from its straight downward position to the up position shown in FIGURE 5. This rotation of the handle through 180° rotates the cam 12 and by action of the upper roller 34 on the lever 27 raises this lever about its pivot 28 to raise the infuser head 29 from the infuser body 18 and expose a previously used pod 37 which, as explained above, may contain ground coffee beans.

The raising of the lever 27 and the head 29 occurs through the first 90° of movement of the arm 10 from its downwardly extending position. This first 90° of movement also turns the locking disk 15 90° so that the space 16 is opposite a projection 126 bounded by the arcuate edge portions 21 of the locking plate 20. This releases the locking plate 20 as well as the gear 19 and infuser body 18 for movement. Then rotation of the handle 10 through the second 90° of this 180° movement to the position shown in FIGURE 5 causes engagement of the 90° segment gear 14 with the circular gear 19 to rotate the infuser body 18 90°. This brings the next flat surface 23 upright with the next fresh coffee pod 37 beneath the infuser head 29. The movement of the tape 36 and infuser body 18 is coordinated to bring this about by engagement of the infuser body pins 38 with corresponding openings 38a, FIGURE 2, in the tape 36.

As the circular gear 19 is rotated in its counterclockwise direction, it rotates the smaller gear 44 in a clockwise direction. This rotation of gear 44 causes gear 45 to rotate and causes the brush 41 to rotate in the direction of movement of tape 36 to strip the wet tape 36 from the infuser body 18 and the pins 38.

When the infuser body 18 has been indexed to its next position, as explained above, with a fresh coffee pod 37 uppermost, the periphery of the locking disk 15 has been moved into engagement with one of the arcuate surface portions 21 on the locking plate 20. This holds the locking plate and thus the infuser body 18 against rotational movement.

Continued rotation of the handle 10 from the position shown in FIGURE 5 in a clockwise direction toward its initial downwardly extending position causes cam 12 to operate on roller 35 and bring the infuser head 29 downwardly to the position shown in FIGURE 3. A seal is provided between the infuser head 29 and the marginal flat sheet of tape 36 surrounding the uppermost coffee pod 37 on the body 18 by means of a rubber O-ring 127 on the bottom of the head.

As the full 360° rotation of crank handle 10 nears its end, stop 46 on segment gear 14 contacts the inner surface 128 of the upper end of the stop latch 47. This causes the latch to move in a clockwise direction about its pivot 51 to lower arm 53 and raise arm 55. This causes catch 56 to engage the end 64 of lever 62 and move it clockwise about its pivot 63. This moves the stop 65 end of the lever 62 to the left as shown in FIGURE 5 which releases the lever 74 from the catch 125 so that the spring 80 forces collar 81 downwardly which forces the lever 74 and the diaphragm 79 to their lowered positions. This lowering of the lever 74 permits contacts 70 and 72 to close under the urging of spring arm 71. The movement of the lower end 65 of lever 62 to the left causes clockwise movement of the lever 66 under the urging of its spring 68 to place it in blocking position so that, if pressure is present beneath diaphragm 79 after the above-described release of arm 74, the latch 125 cannot relatch the arm in the upper position.

Approximately 10° from the end of the 360° complete rotation of the crank handle 10, stop 46 contacts the stop latch 47 near its lower end at 130 to move the stop latch 47 a small distance in a counterclockwise direction. This is enough to move the catch 48 into intercepting position as shown in FIGURE 3 so that attempted reverse rotation of the handle 10 is prevented.

The manner in which water is heated and raised to the infuser head 29 for passage through the pod 37 will now be described.

Closing of the contacts 70 and 72 in the manner previously described energizes the solenoid 91 to raise the plunger 92 from the valve seat 93. Water flows from the water tank 81A (which is vented to the atmosphere at the top) through the check valve 82, water line 83, and dip tube 85 into the boiler 84. As water rises in the boiler 84 it passes through the solenoid valve and upwardly in the vent tube 95 until it reaches the same level as the water in the tank 81A. At the same time water enters the tubes 87 and 88 but cannot get into the infuser head 29 as a portion of the tube 88 adjacent the flexible end 89 is above the water level 90 in the tank 81A.

As the thermostat switch 97 is cold the contacts 98 and 99 are closed. Furthermore, the cold water from the tank 81A flowing into the boiler 84 keeps it cold.

The closing of the switch 70–72 energizes the high capacity resistance heater 86 and quickly brings the water within the boiler 84 to the boiling point. As the pressure builds up in the boiler, the water in valve 91 and vent pipe 95 is blown out the vent pipe through a restricting orifice 96 in the upper end of the pipe. Sufficient steam pressure is built up in the boiler so that orifice 96 maintains the pressure in the boiler. This pressure causes hot water to be forced from the boiler by the steam pressure upwardly through the dip tube 85 and to apply this pressure through the tube 87 to the bottom of the diaphragm 79. This raises the shaft 76 and thus the arm 74 upwardly to rotate the lever about its pivot 73 and cause the finger 75 to open the switch 70–72. The lever 74 is retained in this elevated position by its engagement with the catch surface 125 so that the switch 70–72 is maintained open.

When switch 70–72 opens, the solenoid 91 is de-energized and the spring 94 pushes the plunger 92 downwardly to seat on the valve seat 93. At the same time the resistance heater 86 is de-energized. Residual heat from this heater however will continue to raise the pressure in the boiler to force the last remaining water above the bottom of the dip tube 85 outwardly. This water plus the heated water originally in the boiler is forced by this action through the dip tube 85 and tubes 88 and 89 into the infuser head 29, through the dry mix pod 37 and through the interior 26 of the infuser body into the funnel 124 and from there into the cup 121.

As the last portion of hot water and steam flows up the dip tube 85 the heat causes the bimetal thermostat 97 to move and open the switch 98–99. This prevents premature action in attempting to make a subsequent cup of beverage.

With the apparatus of this invention, before a second cup of coffee in the illustrated embodiment can be brewed, the release button 113 must be pressed and the crank 10 rotated as previously described. Furthermore, the lever 74 must be brought to its lowered position in order to close switch 70–72. This action has of course previously been described also. However, the next cup of coffee cannot be brewed until switch 98–99 is closed and this switch will remain open until pressure in the boiler 84 drops to atmospheric and cold water from the tank 81A begins to flow into the boiler 84. As described earlier, this flow of cold water will hold switch 98–99 closed. Therefore, with this construction, if two cups of beverage, such as coffee, are brewed in rapid sequence, the temperature control switch 98–99 determines the operation of the system. The system will not operate until the boiler 84 is partially full of water. If there has been the necessary brief amount of time to permit the cold water to fill the boiler 84, then switch 70–72 controls the operation and the beverage can be produced as described earlier.

To summarize the operation of this beverage maker and dispenser in making, for example, one cup of coffee at a time, the handle 10 is rotated 360° in a clockwise direction as viewed from the front from a downwardly extending position. The first 90° of rotation releases the locking disk 15 from the locking plate 20 by causing the cut-away section 16 to coincide with one of the projections 126. At the same time the infuser head 29 is raised from the infuser body 18 which of course breaks the seal caused by the gasket 127. This also exposes the used pod 37. In addition, this first 90° of movement of the handle moves the segment gear 14 up to the circular gear 19 preparatory for engagement therewith.

In the second 90° of movement of the handle from a horizontal left extending position to a vertical up position, the 90° movement of the segment gear 14 engaging the circular gear 19 rotates the infuser body 18 90° to bring the next succeeding flat surface 23 of the body to horizontal position beneath the infuser head 29 with a fresh pod 37 in place. This movement through the second 90° also rotates gears 44 and 45 which in turn rotate the brush 41 in a counterclockwise direction to strip the wet tape 36 from the body 18 and from the pins 38. At the end of this 90° movement, the locking disk 15 slidably engages a surface 21 on the locking plate 20 in order to hold the shaft 17 and thus the infuser body 18 against movement.

In the last 180° of movement of the handle 10 from a vertical upstanding position to a vertical down position the lever 27 and infuser head 29 are lowered to clamp the head 29 over the fresh pod 37. This movement also causes the stop 46 on the segment gear 14 to contact the end 128 of latch 47 and oscillate it in a clockwise direction to start the operation of the heater 86 leading toward expelling hot water through the line 88, the head 29 and the pod 37 to produce the resulting beverage which falls through the head 18 into the funnel 124 and from there into the cup in the manner previously described.

As explained previously, the operation of the device is controlled primarily by the two switches 70–72 and 98–99. These are in series with the third switch 104–105 which is merely a safety switch which shuts off the device whenever water in the tank 81A falls to a dangerously low level. If the boiler 84 contains cold water that has flowed by gravity from the tank 81A into the boiler 84, the flow of this cold water acting on the bimetal 97 closes switch 98–99. Then the closing of switch 70–72 by the above described movement of the latch 47 energizes the solenoid 91 to raise the valve plunger 92 to elevated position and open the passageway through the solenoid valve and through the vent tube 95. This insures that the boiler 84 as well as the various water lines 83, 85, 87, 89 and 95 will be full of water up to the water level 90 in the tank 81A. At the same time, the closing of the switch 70–72 energizes the heater 86 with the resulting action as previously described of boiling the water and forcing the water through the infuser head and body to produce the beverage.

The boiling of the water in the boiler 84 raises the diaphragm 79 to raise the switch lever 74 and break the circuit through the switch 70–72. At the same time back pressure caused by the restrictive orifice 96 forces the water through the dip tube 85 and through line 87 of the system to produce the beverage from the mix in the pod 37. The flow of hot water through the dip tube 85 heats the bimetal arm 97a and opens the switch 98–99 which will then not be closed until the system cools off or until cold water flows from the tank 81A down the dip tube 85 into the boiler 84.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. In a beverage maker and dispenser, apparatus comprising: a rotatable infuser body having a plurality of perforate receptacle sections arranged in series around the periphery of said body each for receiving a measured portion of a beverage producing dry mix; an elongated filter tape having a plurality of said mix portions located therein spaced similarly to said receptacle sections; interengaging means on said body and tape for moving said tape on rotation of said body with successive mix portions received in successive receptacle sections in infusing position; and stripper guide means engaging said tape adjacent to but spaced from the said section next succeeding said infusing position for permitting only one said mix portion being received in only one corresponding receptacle section at any given time.

2. In a beverage maker and a dispenser, apparatus comprising: a rotatable infuser body having a plurality of perforate receptacle sections arranged in series around the periphery of said body each for receiving a measured portion of a beverage producing dry mix, said body being rotatable about a generally horizontal axis; an elongated filter tape having a plurality of said mix portions located therein spaced similarly to said receptacle sections; interengaging means on said body and tape for moving said tape on rotation of said body with successive mix portions received in successive receptacle sections when each said successive section is turned to an upright position; a pair of guide means engaging said tape on opposite sides of said body, a first guide means thereby being on the dry side of the tape and the second on the wet side, said second guide means including a rotatable brush contacting said tape on the side next to said body; a first gear rotatable with said body; a second gear periodically engageable with said first gear for rotation thereof; a first locking member rotatable with said body and first gear; a second locking member rotatable into and out of engagement with the first locking member, said first and second gears being out of engagement when said locking members are in engagement, and vice versa; a third gear rotated by said first gear; a fourth gear rotated by said third gear for rotating said brush to wipe said tape in a direction away from said body; means for simultaneously rotating said first and second gears into engagement and said first and second locking members out of engagement to turn thusly a receptacle section to said upright position with a mix portion therein, and then said first and second gears out of engagement and said first and second locking members into engagement to hold said infuser body substantially motionless in said upright position; and means cooperating with said body for flowing hot water through said upright section and the mix portion therein during said holding.

3. In a beverage maker and dispenser, apparatus comprising: an infuser body having a receptacle section adapted to contain a measured portion of a beverage producing dry mix; a water boiler; a water conduit from said boiler to said infuser body; an energizable heater associated with said boiler for boiling water therein; a water conduit to said boiler; and thermal responsive means in heat transfer relationship with both said conduits for permitting energizing of said heater only on flow of water through said conduit to said boiler and de-energizing said heater on flow of water through said conduit to said infuser body.

4. In a beverage maker and dispenser, apparatus comprising: an infuser body having a receptacle section adapted to contain a measured portion of a beverage producing dry mix; a water boiler; an electric heater associated with said boiler for boiling water therein; an electric circuit including said heater; a water container; a cold water conduit from said container to said boiler for gravity flow of water therethrough; a hot water conduit from said boiler to said infuser body having a conduit section at a level higher than the maximum water level in said container; and thermal responsive means in heat transfer relationship with both said conduits for closing said circuit on flow of cold water through its conduit and opening said circuit on flow of hot water through its conduit, said conduits having a common conduit section at which said thermal responsive means is located.

5. In a beverage maker and dispenser, apparatus comprising: an infuser body having a receptacle section adapted to contain a measured portion of a beverage producing dry mix; a water boiler; a hot water conduit from said boiler to said infuser body having a conduit section at a level higher than the maximum water level in said container; an electric heater associated with said boiler for boiling water therein; an electric circuit including said heater; a water container at a level above said boiler; a cold water conduit from said container to said boiler for gravity flow of water therethrough; restricted flow conduit means from adjacent the top of said boiler terminating at an end in the container above the maximum water level in the container; an electrically operated conduit valve means in said conduit means; an electric circuit to said valve means; thermal responsive means closing said heater circuit to energize said heater and closing said valve circuit to open said valve on flow of cold water through its conduit, and opening said heater circuit and said valve circuit on flow of hot water through its conduit to said infuser body, said cold water conduit and hot water conduit having a common conduit section at which said thermal responsive means is located; and means for interrupting both said circuits when water in said container reaches a predetermined low level.

6. In a beverage maker and dispenser, apparatus comprising: an infuser body having a receptacle section adapted to contain a measured portion of a beverage producing dry mix; a water boiler; an electric heater associated with said boiler for boiling water therein; an electric circuit including said heater; a water container at a level above said boiler; a cold water conduit from said container to said boiler for gravity flow of water therethrough; restricted flow conduit means from adjacent the top of said boiler terminating at an end in the container above the maximum water level in the container; an electrical circuit; an electrically operated conduit valve means in said conduit means electrically connected in said circuit; thermal responsive first switch means closing said circuit to energize said heater and open said valve on flow of cold water through its conduit, and opening said circuit on flow of hot water through its conduit, said cold water conduit and hot water conduit having a common conduit section at which said thermal responsive means is located; and second switch means for interrupting said circuit when water in said container reaches a predetermined low level.

7. In a beverage maker and dispenser, apparatus comprising: a movable infuser body having a plurality of perforate receptacle sections arranged in series for receiving a measured portion of a beverage producing dry mix; an elongated filter tape having a plurality of said mix portions located therein spaced similarly to said receptacle sections; interengaging means on said body and tape for moving said tape on corresponding movement of said body with successive mix portions engaging successive receptacle sections; means for moving said body; a water boiler; a hot water conduit from said boiler to said infuser body; an energizable heater associated with said boiler for boiling water therein; a cold water conduit to said boiler; thermal responsive means for permitting energizing of said heater only on flow of cold water through its conduit and de-energizing said heater on flow of hot water through its conduit; and switch means for energizing said heater operated by said body moving means.

8. In a beverage maker and dispenser, apparatus comprising: a hollow rotatable infuser body having a plurality of perforate receptacle sections arranged in series around the periphery of said body each for receiving a measured portion of a beverage producing dry mix, the perforations of said sections communicating with the interior of said body and said body being rotatable about a generally horizontal axis; an elongated filter tape having a plurality of said mix portions located therein spaced similarly to said receptacle sections; interengaging means on said body and tape for moving said tape on rotation of said body with successive mix portions received in successive receptacle sections when each said successive section is turned to an upright position; means for rotating said body about said axis; means operated by said rotating means for holding said body substantially motionless for a time interval during whch a mix portion is received in a receptacle section; a water boiler; an electric heater associated with said boiler for boiling water therein; an electric circuit including said heater; a water container; a cold water conduit from said container to said boiler for gravity flow of water therethrough; a hot water conduit from said boiler to said infuser body having a conduit section at a level higher than the maximum water level in said container; means operated by said rotating means for energizing said heater during said interval to boil water in said boiler and force said water through said hot water conduit, through a perforate section containing a mix portion to produce a beverage, then through said interior and through perforations in empty sections to a beverage destination; and thermal responsive means closing said circuit on flow of cold water through its conduit and opening said circuit on flow of hot water through its conduit, said conduits having a common conduit section at which said thermal responsive means is located.

9. In a beverage maker and dispenser, apparatus comprising: an infuser body having a receptacle section adapted to contain a measured portion of a beverage producing dry mix; a water container for relatively cool water; a water boiler; a cool water conduit between said container and boiler; a hot water conduit from said boiler to said infuser body; an energizable heater associated with said boiler for boiling water therein; and thermal responsive means in heat transfer relationship with both said conduits for permitting energizing of said heater only on the flow of the relatively cool water from said water container through said cool water conduit and de-energizing said heater on flow of hot water from said boiler through said hot water conduit to said infuser body.

10. Beverage brewing and dispensing apparatus comprising: an infuser body and a mating infuser head co-operable with each other to define a cavity for receiving a charge of beverage producing material, a water inlet leading into said infuser head and a beverage outlet discharging from said infuser body, means for clamping said infuser head against said infuser body to withstand steam pressure applied within said cavity during a process of brewing beverage from said material and to separate said infuser head from said infuser body for discharging spent material from said cavity after completion of said brewing process, a water boiler, means including a water storage reservoir and a charging conduit connected to said water boiler for automatically charging said water boiler with a charge of water, a conduit interconnected between the inlet of said infuser head and the interior of said water boiler, water heating means in heat exchange relationship with said boiler, first valve means in said charging conduit precluding reverse fluid flow from said water boiler to said storage reservoir, a vent tube connected to said water boiler for venting said boiler at a controlled rate of discharge, second valve means in said vent tube, an electric control circuit controlling the energization of said water heating means and said second valve means, a switch in said circuit, means for energizing said circuit to actuate said second valve means and said heating means so as to open said vent tube and raise the temperature of the charge of water within said boiler to its boiling point, and means responsive to a condition produced by the boiling of said water for actuating said switch to de-energize said heating means and said second valve means and cause steam pressure generated within said boiler to force boiling water through said charge of material and out said beverage outlet.

References Cited by the Examiner
UNITED STATES PATENTS

| | | | |
|---|---|---|---|
| 2,291,023 | 7/1942 | Burklin | 126—362 |
| 2,835,782 | 5/1958 | Stiebel | 99—281 X |
| 3,046,869 | 7/1962 | Reynolds. | |
| 3,125,945 | 3/1964 | Hanson et al. | 99—289 |

FOREIGN PATENTS

| | | |
|---|---|---|
| 1,238,694 | 7/1960 | France. |

CHARLES A. WILLMUTH, *Primary Examiner.*

JOSEPH D. BEIN, ROBERT E. PULFREY, *Examiners.*